United States Patent
Pinet et al.

(10) Patent No.: US 8,003,845 B2
(45) Date of Patent: Aug. 23, 2011

(54) PROCESS FOR THE COMPLETE COMBUSTION AND OXIDATION OF THE MINERAL FRACTION OF WASTE TREATED IN DIRECT INCINERATION-VITRIFICATION APPARATUS

(75) Inventors: Olivier Pinet, Poulx (FR); Christophe Girold, Piolenc (FR)

(73) Assignees: Commissariat a l'Energie Atomique, Paris (FR); Compagnie Generale des Matieres Nucleaires, Velizy Villacoublay (FR)

( * ) Notice: Subject to any disclaimer, the term of this patent is extended or adjusted under 35 U.S.C. 154(b) by 512 days.

(21) Appl. No.: 11/597,537

(22) PCT Filed: May 25, 2005

(86) PCT No.: PCT/FR2005/050365
§ 371 (c)(1),
(2), (4) Date: Nov. 22, 2006

(87) PCT Pub. No.: WO2005/118492
PCT Pub. Date: Dec. 15, 2005

(65) Prior Publication Data
US 2008/0264311 A1 Oct. 30, 2008

(30) Foreign Application Priority Data

May 26, 2004 (FR) ..................... 04 51035

(51) Int. Cl.
G21F 9/00 (2006.01)
G21F 9/16 (2006.01)
G21F 9/14 (2006.01)
G21F 9/20 (2006.01)
A62D 3/40 (2007.01)
B09B 3/00 (2006.01)
F23D 14/00 (2006.01)
F23G 5/00 (2006.01)
F23G 7/00 (2006.01)
C03B 19/10 (2006.01)

(52) U.S. Cl. .............. 588/11; 588/18; 588/20; 588/321; 588/400; 110/235; 110/237; 65/17.1

(58) Field of Classification Search .................. 65/17.1; 110/235–259; 588/11, 18, 19, 20, 321, 400, 588/405–414, 900
See application file for complete search history.

(56) References Cited

U.S. PATENT DOCUMENTS
5,035,735 A * 7/1991 Pieper et al. ................. 65/134.8
(Continued)

FOREIGN PATENT DOCUMENTS
FR 2 746 037 9/1997

OTHER PUBLICATIONS

Roth, G.; Weisenburger, S.; "Vitrification of high-level liquid waste: glass chemistry, process chemistry and process technology". Nuclear Engineering and Design 202 (2000) 197-207.*

(Continued)

*Primary Examiner* — Jerry Lorengo
*Assistant Examiner* — Jennifer A Smith
(74) *Attorney, Agent, or Firm* — Nixon Peabody LLP

(57) ABSTRACT

The invention concerns a process enabling the complete combustion and oxidation of the mineral fraction of combustible waste contained in an apparatus intended to treat waste by direct incineration-vitrification, said process comprising the following steps:
  a step to add said waste to the apparatus for its depositing on the surface of a molten glass bath contained in the apparatus,
  an incineration and oxidation step of the waste on the surface of the glass bath,
  an incorporation step to incorporate combustion products in the glass during which the glass bath, the combustion products and any vitrification additives added to the glass bath are heated until a paste-like, liquid mass is obtained,
  a step during which said mass is removed from the apparatus and left to cool to obtain finally what is called a confinement matrix, said process being characterized in that the complete combustion and oxidation of the waste is achieved partly during the waste adding step and partly during the waste incineration and oxidation step on the surface of the glass bath, through the presence of holding means enabling the waste to be maintained for a determined time under oxidizing vapors derived from gases added to the apparatus and/or via the addition of oxidants to the waste, during these two steps.

29 Claims, 1 Drawing Sheet

U.S. PATENT DOCUMENTS

| | | | |
|---|---|---|---|
| 5,100,453 A | 3/1992 | Richards | |
| 5,186,112 A | 2/1993 | Vojtech | |
| 6,576,807 B1 * | 6/2003 | Brunelot et al. | 588/311 |
| 2008/0264311 A1 * | 10/2008 | Pinet et al. | 110/346 |

OTHER PUBLICATIONS

International Search Report for International Application No. PCT/FR2005/050365, mailed Oct. 5, 2005.

* cited by examiner

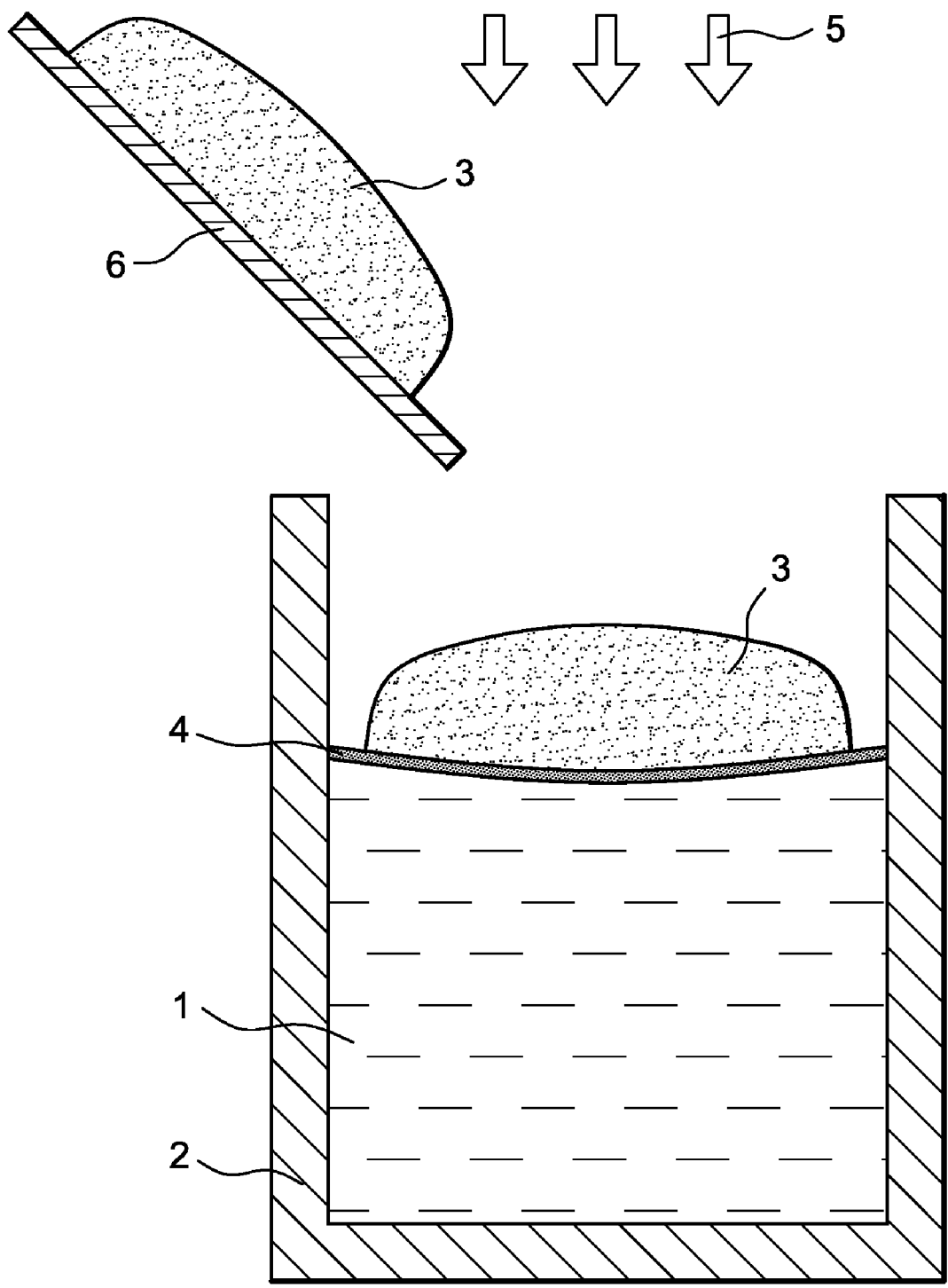

PROCESS FOR THE COMPLETE COMBUSTION AND OXIDATION OF THE MINERAL FRACTION OF WASTE TREATED IN DIRECT INCINERATION-VITRIFICATION APPARATUS

CROSS REFERENCE TO RELATED APPLICATIONS OR PRIORITY CLAM

This application is a national phase of International Application No. PCT/FR2005/050365 entitled "Method Enabling The Complete Combustion And Oxidation Of The Mineral Fraction Of Waste Treated In A Direct Combustion-Vitrification Device", which was filed on May 25, 2005, which was not published in English, and which claims priority of the French Patent Application No. 04 51035 filed May 26, 2004.

TECHNICAL AREA

The invention relates to a process with which to achieve complete combustion and oxidation of the mineral fraction of waste treated in an apparatus for direct incineration-vitrification.

PRIOR ART

For several years, numerous research and development studies have been focusing on the problem of immobilizing the toxic fraction of combustible waste or mixed waste (organic and inorganic) in a matrix of vitreous or vitro-ceramic type (called confinement matrix), waste toxicity possibly being chemical (heavy metals) or radioactive.

This type of research work is being conducted by multiple teams across the world since the advantages of said research are multiple: stabilising the waste to be treated, achieving a proven, durable confinement matrix, reducing the initial volume of waste . . . .

One solution proposed by the known prior art is an industrial process with which it is possible to achieve both incineration of the waste and vitrification of the mineral fraction of the waste in a single apparatus. Different technologies applied consist of forming a glass bath or molten matrix by fusion, and adding the waste to be treated to its surface. The organic fraction of the waste therefore decomposes or burns depending on the atmosphere prevailing inside the apparatus, while the mineral fraction, except for the volatilized part, is incorporated more or less homogeneously into the molten matrix.

Several technological pathways have been explored at laboratory or industrial level to obtain these results.

In the variants most often encountered, the waste incineration-vitrification process uses a system which comprises a crucible melter which may be refractory or a cooled metal structure, fixed or mobile in rotation about its axis, and heating and melting means for the vitreous or vitro-ceramic waste confinement matrix which is obtained either using immersed electrodes, or by induction in a susceptor or directly in the confinement matrix made conductive, or using plasma. Several heating modes may be associated to obtain temperature homogeneity of the confinement matrix and an increase in the incineration yield. Each of these configurations evidently has its own advantages and disadvantages, but all focus on the efficacy, reliability and simplification of the incineration-vitrification process.

The objective of waste incineration-vitrification processes is to guarantee high-performing, durable confinement in a glass-type matrix of the toxic elements contained in the initial waste. However, the waste confinement properties within the matrix, i.e. the quality and homogeneity of the final confinement matrix obtained, are highly dependent on the type of atmosphere and treatment conditions on the surface of the glass bath (temperature, accumulation of material, mixing . . . ). A highly heterogeneous confinement matrix including de-mixed metal phases of substantial size, even strata of different types, is therefore detrimental in terms of waste storage, hazardous waste in particular.

Chemical phenomena occurring during incineration, or interaction between the waste to be treated and the molten matrix, may lead to such heterogeneities.

For example, when incinerating mineral-rich waste, this waste may rapidly form metal or sulphide species which take a long time to oxidize and which, through difference in density, will quasi irremediably cross through the bath surface and settle. This is the case for example with nickel or iron sulphides which accumulate at the bottom of the glass bath, possibly carrying radioelements with them if the waste is radioactive.

More simply, chemical reduction phenomena alone can lead to the reducing of species to the metal state on the bath surface if their stay time at this point, supposed to be oxidizing, is too short to allow their oxidation.

The different prior art technologies used do not all have the same capability to cope with these chemical and interaction phenomena. Those which set up reducing atmospheres on the surface of the glass bath are those which produce the most of these heterogeneous phases. Also, while technologies using oxygen plasmas bring a substantial decrease in these phenomena, they do not manage to prevent them completely however. Studies focusing on completing the oxidation of these phases in the vitreous matrix have currently not been able to achieve quantitative elimination of these phenomena.

The object of the incineration-vitrification process described below is therefore to overcome these shortcomings by allowing the waste and its decomposition sub-products to oxidize sufficiently on the surface of the glass bath so that the minerals are able to incorporate themselves into the glass without generating settling phases at the bottom of the crucible melter.

DESCRIPTION OF THE INVENTION

This object is achieved with a process enabling the complete combustion and oxidation of the mineral fraction of combustible waste contained in an apparatus intended to treat waste by direct incineration-vitrification, said process comprising the following steps:

a step to add said waste to the apparatus to deposit the waste on the surface of a molten glass bath contained in the apparatus, an incineration and oxidation step of the waste on the surface of the glass bath, a step to incorporate combustion products into the glass during which the glass bath, the combustion products and optional vitrification additives added to the glass bath are heated until a paste-like liquid mass is obtained, a step during which said mass is removed from the apparatus and left to cool in order finally to obtain what is called a confinement matrix, said process being characterized in that the complete combustion and oxidation of the waste is partly achieved during the waste adding step and partly during the waste incineration and oxidation step on the surface of the glass bath, through the presence of holding means enabling the waste to be held for a determined time under oxidizing vapours derived from gases added to the apparatus or/and through the addition of oxidants to the waste during these two steps.

The addition of oxidants may be complementary to or in replacement of the one or more types of proposed holding systems.

The oxidizing agents used, other than oxygen-containing gases, may be liquids or solids added to the waste or to the combustion products in the course of treatment over the glass bath. Therefore, the support used to hold the waste makes it possible to delay the penetration of the waste into the glass bath before completion of the combustion step of said waste and the oxidation of the combustion sub-products of this waste: the waste burns under the oxygen of the gases sent onto the surface of the glass bath, and liquid or solid oxidants are optionally added to complete or accelerate the oxidation reaction of the waste combustion sub-products. This process enables complete combustion of the combustible materials and sufficient oxidation of minerals prior to their incorporation into the vitreous matrix, thereby preventing the obtaining of a confinement matrix whose qualities are denatured by the inclusion of reduced phases due to faulty oxidation during the process.

Advantageously, the combustible waste is mixed organic and mineral waste.

Advantageously, the waste holding means comprise a rigid support allowing the waste to be held during the adding step.

Advantageously, the waste holding means comprise a surface layer, called temporary protective layer, present on the surface of the glass bath and allowing the waste to be maintained on the surface of the glass bath during the incineration and oxidation step, said layer having a higher surface tension coefficient than the molten glass bath.

The temporary protective layer of the glass bath is a layer enabling the combustion products to be kept above the surface of the glass bath for a determined time. The temporary surface protective layer therefore has physicochemical properties enabling it to ensure the maintaining of the products to be treated and the sub-products undergoing oxidation on the surface of the glass bath for a sufficient time.

Advantageously, the temporary protective layer is obtained according to at least one of the following steps:
lowering the temperature of the glass bath surface,
adding material over the glass bath surface.

According to one particular embodiment, the temporary protective layer is completed by the addition of at least one other surface layer, called temporary protective over-layer, said at least one temporary protective over-layer having at least one of the following functions:
under the effect of the weight of the waste superimposed above it, to develop interface forces with the temporary protective layer improving the non-penetration into the glass bath of particles derived from said waste,
to improve the distribution of mechanical stresses on the entire surface of the temporary protective layer, through the intermingling of the constituents of said temporary protective over-layer, or through chemical bonds which strengthen said temporary protective over-layer,
to protect the temporary protective layer against chemical attack by the waste.

In one particular case, at least the temporary protection layer or the temporary protection over-layer or over-layers are eliminated, before the incorporation step, by chemical action. This may be chemical action of surrounding elements, i.e. of the other over-layers, or of elements specially added for this purpose.

In another particular case, at least the temporary protective layer or the temporary protective over-layer or over-layers are eliminated, before the incorporation step, by means chosen from among raising the temperature of the glass bath, bubbling the surface of the glass bath, a mechanical method or a method using the thermo-hydraulic movements of the glass bath.

Advantageously, the temporary protective layer and the temporary protective over-layer(s) have a chemical composition compatible with the composition of the glass bath. Therefore the constituents of these protective layers may finally be incorporated in the glass bath.

According to a first particular embodiment, the temporary protective layer and temporary protective over-layer(s) are obtained by dispersing particulate matter on the surface of the glass bath, chosen from among powders, frits, flakes or fibres.

According to a second particular embodiment, the temporary protective layer and the temporary protective over-layer(s) are obtained by dispersing material in gel form on the surface of the glass bath or on the surface of a previously deposited layer. Gel has the advantage of spreading more easily than particulate matter and allows easier coverage of the entirety of the surface to be protected.

According to a third particular embodiment, the temporary protective layer and the temporary protective over-layer(s) are pre-fabricated and directly deposited on the surface of the glass bath or on the surface of a previously deposited layer.

One of the advantages of this complete oxidizing process of the mineral fractions in combustible waste is that it is easy to implement and is easily adaptable to any problem raised, through the possible variation in the type of support used to hold the waste while it is being added to the process, in the physicochemical nature of the protective layer, in the chemical nature of the oxidants used and in the destruction mode of the protective layer. This process mostly finds applications in the treatment of combustible radioactive waste which it is desired to vitrify. As example, mention may be made of the treatment of sulphur-rich materials which might react with the glass bath or create sulphides during their incineration, the treatment of ion exchange resins, salts coated with an organic matrix, sludges . . . .

By extension, applications to special industrial waste may also be considered.

BRIEF DESCRIPTION OF THE DRAWING

The invention will be better understood and other advantages and characteristics will become apparent on reading the following description given by way of example and non-limiting, accompanied by the appended drawing of the FIGURE which is a diagram showing a cross-sectional view of the device used to implement the process according to the invention.

DETAILED DESCRIPTION OF PARTICULAR EMBODIMENTS

In the FIGURE a crucible melter 2 can be seen, containing a molten glass bath 1 on whose surface a protective layer 4 can be formed. Using a feeder system 6, waste is poured onto the surface of the glass bath. This feeder system 6 may also act as support or system to hold the waste 3, making it possible during the waste incorporation step into the crucible melter 2, to conduct part of the combustion of the waste 3. Reference 5 denotes gases, solids or liquids added to the crucible to act on the oxidation and combustion of the waste 3. These may be a stream of gaseous oxygen and/or an oxygen plasma applied to the waste 3 (also called reactive filler), and/or solid or liquid oxidants, and/or vitrification additives (glass frit, silica, carbonates, various oxides . . . ).

To achieve the targeted objective, namely to prevent the non-incorporation into the glass of reduced species of metal or sulphide type for example, and subsequently to prevent settling phenomena, the combustion of the waste above the glass bath must be ensured until complete oxidation of the minerals it contains. The supporting of the waste by a mechanical part during the waste incorporation or feeding step into the apparatus, or the holding of the combustion products by means of a protective layer 4, particularly enables complete combustion of combustible materials and sufficient oxidation of mineral materials for their incorporation into a confinement matrix. These two holding modes make it possible to cause the waste to react above the surface of the glass bath either with oxygen-containing gases or with solid or liquid oxidants (nitrates, sulphates, nitric acid, sulphuric acid . . . ). The gaseous, liquid or solid oxidants may be added to the reactive filler one after the other or at the same time. Their choice depends upon the waste under consideration, on process-related constraints, on the compatibility of the chemical elements brought by the oxidants with the composition of the glass finally obtained.

It was seen above that the main function of the protective layer 4 is to increase the surface tension on the surface of the glass bath 1. To ensure this function, the temporary protective layer has a higher surface tension coefficient than the glass bath at its temperature of formation (corresponding to a viscosity of approximately 100 dPa·s). This layer, through the development of interface forces with the particles in contact with it, prevents the penetration of undesired material into the glass bath.

Also, the supporting of the waste above the glass bath ensured by a rigid support 6, during the waste incorporation step into the apparatus, or by the protective layer 4 on the surface of the glass bath, is temporary by definition. It has its use during the waste incineration and oxidation period. The protective layer is destined to be destroyed in order to enter into the final composition of the vitreous matrix produced. The destruction of the protective layer can be achieved naturally, i.e. the layer is eliminated by corrosion. It may result either from the effect of the technology used to perform incineration-vitrification (e.g. raising the temperature of the glass bath, in particular using a plasma torch), or from the addition of reagents into these protective layers which will dissolve the layer after a stay time corresponding to the desired lifetime of said layer. Chemical attack by elements added at the end of the incineration period may be of particular interest, if these elements enter into the composition of the glass finally obtained. The chemical composition of the protective layer(s) must therefore be preferably compatible with the composition of said matrix. Hence, for the composition of the protective layers and over-layers, elements are preferably chosen which enter into the composition of the vitreous matrix. These added elements may also, according to the chemical form under which they are added (oxidant, reducer . . . ) and prior to the destruction of the protective layer or over-layer, participate in reactions with products derived from the waste 3.

Example of Implementation of the Inventive Process

Glass melt of borosilicate type is used chiefly consisting of 41.5% $SiO_2$ (silica), 18.5% $B_2O_3$ (boric anhydride), 10% $Al_2O_3$ (alumina), 20% $Na_2O$ (sodium oxide), 5% $Fe_2O_3$. This glass melt has a viscosity of approximately 40 dPa·s at 1200° C. The weight of the glass melt used for the experiments was 300 g having a surface area of $7.3.10^{-3}$ m$^2$. The waste 3, deposited on the surface of the glass bath formed from this glass melt, was a mixture of 25 g powder containing coke (simulating the organic fraction of incinerable waste), barium sulphate, and nickel, iron and copper oxides. Two sulphide beads were added thereto, having a diameter of 5 mm.

After treatment in air for one hour at 1200° C. and in the absence of a protective layer 4, numerous beads of metal appearance were found at the bottom of the crucible, evidencing the phenomena whose onset it is sought to avoid.

This experiment was reproduced, this time placing on the glass bath 1 a silica-rich protective layer having a thickness of approximately 2 mm. The protective layer together with the glass melt, rising under capillarity, therefore forms a viscous mixture containing fine, partly dissolved, silica particles. After treatment in air for one hour at 1200° C., it was found that no bead had crossed through the surface of the glass bath. The waste 3 had mainly been incinerated and numerous metal beads were formed which, due to the temporary protective layer 4, had remained above the surface of the glass bath. The presence of these beads can be explained by the fact that the quantity of oxygen supply was insufficient to complete oxidation of the waste.

It will be noted that in the above-described case, there is no need to add any over-layer to protective layer 4 to hold the waste and combustion products on the surface.

The elimination of this protective layer is obtained under the same temperature conditions through the addition of $Na_2B_4O_7$. It is to be noted that these chemical species for destruction of the protective layer were chosen so as to enter into the composition of the glass finally obtained.

The same experiment was reproduced on industrial scale: 30 kg of glass melt were heated by direct induction in a cooled metal crucible over which a device was placed generating a transferred oxygen plasma arc between twin metal torches, and 3 kg of waste of the same type as previously were treated on a protective layer. On completion of the incineration-vitrification process, the same conclusions as previously could be drawn: the numerous metal beads formed during the process remained above the surface of the glass bath through the creation of a layer a few millimetres thick rich in silica particles.

The presence of the numerous metal beads is the sign of partial oxidation of the minerals. This is due to the fact that the atmosphere is insufficiently oxidizing.

In another example complete combustion of 300 g of organic waste, containing 120 g of minerals including barium sulphate, iron, nickel and copper oxides, was obtained after being held under a plasma torch for a time of less than 7 minutes.

In a refractory crucible melter, a sample of 22.45 g of combustion products was subsequently deposited on 200 g of borosilicate glass and then covered with 60 g of borosilicate glass and 107 g of sodium nitrate. The mixture was placed in a furnace at 1200° C. The minerals became fully incorporated in the glass, and it was noted that no bead had settled at the bottom of the crucible. The extended stay time under the oxygen of the plasma torch and the addition of an oxidant prevented the formation of a sediment of reduced species. The absence of any liquid or gaseous oxidants, a stay time under the plasma torch that is too short, insufficient holding of the waste above the glass bath do not enable the same result to be obtained.

In one practical application of the inventive process consisting of producing one or more protective layers on a molten glass bath, the incineration-vitrification furnace is preferably designed with multi-zones. In particular, part of the crucible melter is intended for actual incineration of the waste (comprising the waste adding and holding means, the creation of the protective layer and the addition of oxidants), another part is intended for glass refining (and at the same time the recycling of gas scrubbing dust).

The invention claimed is:

1. Process enabling the complete combustion and oxidation of the mineral fraction of combustible waste contained in an apparatus intended to treat waste by direct incineration-vitrification, said process comprising the following steps:
    a step to add said waste to the apparatus for its depositing on the surface of a molten glass bath contained in the apparatus,
    an incineration and oxidation step of the waste on the surface of the glass bath,
    an incorporation step to incorporate combustion products in the glass during which the glass bath, the combustion products and any vitrification additives added to the glass bath are heated until a paste-like, liquid mass is obtained,
    a step during which said mass is removed from the apparatus and left to cool to obtain finally what is called a confinement matrix,
    said process being characterized in that the complete combustion and oxidation of the waste is achieved during the waste incineration and oxidation step through the presence of a surface layer, called a temporary protective layer, and at least one other surface layer, called a temporary protective over-layer;
    wherein the temporary protective layer is present on the surface of the glass bath and enables the waste to be maintained on the surface of the glass bath for a determined time under the oxidizing vapors derived from gases added to the apparatus, said temporary protective layer having a higher surface tension coefficient than the molten glass bath, and having a chemical composition that is different from the composition of the glass bath but that is compatible with the composition of said glass bath; and
    wherein the at least one temporary protective over-layer has at least one of the following functions:
        under the effect of the weight of the waste superimposed upon it, to develop interface forces with the temporary protective layer improving the non-penetration into the glass bath of particles derived from said waste;
        to improve the distribution of mechanical stresses on the entirety of the surface of the temporary protective layer through intermingling of the constituents of said temporary protective over-layer or through chemical bonds which strengthen said temporary protective over-layer;
        to protect the temporary protective layer against chemical attack by the waste.

2. Process as in claim 1, wherein the temporary protective layer is obtained according to at least one of the following steps:
    lowering the temperature of the surface of the glass bath
    adding matter over the surface of the glass bath.

3. Process as in claim 1, wherein at least one layer among the temporary protective layer and the at least one temporary protective over-layer is eliminated before the incorporation step, by chemical action.

4. Process as in claim 1, wherein at least one layer among the temporary protective layer and the at least one temporary protective over-layer is eliminated before the incorporation step, by means chosen from among raising the temperature of the glass bath, bubbling the surface of the glass bath, a mechanical method or a method using the thermo-hydraulic movements of the glass bath.

5. Process as in claim 1, wherein the at least one temporary protective over-layer has a chemical composition compatible with the composition of the glass bath.

6. Process as in claim 1, wherein at least one layer among the temporary protective layer and the least one temporary protective over-layer is obtained by dispersing particulate matter on the glass bath surface, chosen from among powder, frits, flakes or fibers.

7. Process as in claim 1, wherein at least one layer among the temporary protective layer and the least one temporary protective over-layer is obtained by dispersing material in gel form on the surface of the glass bath or on the surface of a previously deposited layer.

8. Process as in claim 1, wherein at least one layer among the temporary protective layer and the least one temporary protective over-layer is pre-fabricated and directly deposited on the surface of the glass bath or on the surface of a previously deposited layer.

9. Process as in claim 1, wherein the complete combustion and oxidation of the mineral fraction of the waste is also obtained during the waste adding step to the apparatus via a rigid support enabling the waste to be maintained for a determined time under oxidizing vapors derived from gases added to the apparatus.

10. Process as in claim 1, wherein the process also comprises a step to add oxidants to the waste during the waste adding step and/or during the waste incineration and oxidation step on the surface of the glass bath.

11. Process as in claim 1, wherein the combustible waste is mixed organic and mineral waste.

12. A process for conditioning a combustible waste into a glass matrix, in which a complete incineration and oxidation of the combustible waste is achieved, which process comprises the following steps:
    (a) introducing the waste into an apparatus which contains a molten glass bath having a surface;
    (b) incinerating the combustible waste in the apparatus and simultaneously oxidizing said combustible waste by gases that are added into the apparatus and which release oxidizing vapors into the apparatus, thus producing incinerated and oxidized products;
    (c) incorporating the so produced incinerated and oxidized products in the molten glass bath and heating said molten glass bath until a paste-like, liquid mass is obtained;
    (d) removing the so obtained paste-like, liquid mass from the apparatus and leaving the mass to cool to obtain the glass matrix with the combustible waste conditioned therein;
    wherein step (b) further comprises:
        providing a temporary protective surface layer between the surface of the molten glass bath and the combustible waste present in the apparatus, which temporary protective surface layer has a chemical composition that is different from the chemical composition of the molten glass bath but that is compatible with the chemical composition of the molten glass bath, has a surface tension coefficient higher than the surface tension coefficient of the molten glass bath, and maintains the combustible waste for a determined time in contact with the oxidizing vapors, whereby a complete incineration and oxidation of the combustible waste is obtained;

destroying the temporary protective surface layer and incorporating the so destroyed temporary protective surface layer in the molten glass bath;

providing at least one temporary protective surface over-layer on the temporary protective surface layer, which temporary protective surface over-layer has at least one of the following functions:

(i) under the effect of the weight of the waste superimposed upon the temporary protective surface over-layer, to develop interface forces with the temporary protective surface layer thus improving the non-penetration into the molten lass bath of particles derived from the waste;

(ii) to improve the distribution of mechanical stresses on the entirety of the surface of the temporary protective surface layer through intermingling of the constituents of the temporary protective surface over-layer or through chemical bonds which strengthen said temporary protective surface over-layer, (iii) to protect the temporary protective surface layer against chemical attack by the waste; and removing the at least one temporary protective surface over-layer.

13. The process of claim 12, wherein providing the temporary protective surface layer is achieved by doing at least one of the following steps:

lowering the temperature of the surface of the molten glass bath adding matter over the surface of the molten glass bath.

14. The process of claim 12, wherein providing the temporary protective surface layer is achieved by dispersing particulate matter on the surface of the molten glass bath, the particulate matter being chosen from among powder, frits, flakes or fibers.

15. The process of claim 12, wherein providing the temporary protective surface layer is achieved by dispersing material in gel form on the surface of the molten glass bath or on the surface of a previously deposited layer.

16. The process of claim 12, wherein providing the temporary protective surface layer is achieved by depositing a pre-fabricated temporary protective surface layer directly on the surface of the molten glass bath or on the surface of a previously deposited layer.

17. The process of claim 12, wherein step (a) further comprises:

maintaining the waste introduced into the apparatus under oxidizing vapors derived from gases added into the apparatus by placing the so introduced waste on a rigid support for a determined time, thus obtaining oxidized waste; and placing the so oxidized waste on the surface of the molten glass bath.

18. The process of claim 12, wherein step (a) and/or step (b) further comprises adding oxidants into the apparatus on the surface of the molten glass bath.

19. The process of claim 12, wherein the combustible waste is a mixed organic and mineral waste.

20. The process of claim 12, wherein destroying the temporary protective surface layer is achieved by chemical action.

21. The process of claim 12, wherein destroying the temporary protective surface layer is achieved by means chosen from among raising the temperature of the molten glass bath, bubbling the surface of the molten glass bath, a mechanical method or a method using the thermo-hydraulic movements of the molten glass bath.

22. The process of claim 12, wherein the removing of the at least one temporary protective surface over-layer is achieved by destroying the at least one temporary protective surface over-layer.

23. The process of claim 22, wherein destroying at least one layer among the temporary protective surface layer and the at least one temporary protective surface over-layer is achieved by chemical action.

24. The process of claim 22, wherein destroying at least one layer among the temporary protective surface layer and the at least one temporary protective surface over-layer is achieved by means chosen from among raising the temperature of the molten glass bath, bubbling the surface of the molten glass bath, a mechanical method or a method using the thermo-hydraulic movements of the molten glass bath.

25. The process of claim 12, wherein the at least one temporary protective surface over-layer has a chemical composition compatible with the composition of the molten glass bath.

26. The process of claim 25, wherein the removing of the at least one temporary protective surface over-layer is achieved by destroying the temporary protective surface over-layer and incorporating the so destroyed temporary protective surface over-layer in the molten glass bath.

27. The process of claim 12, wherein providing the at least one temporary protective surface over-layer is achieved by dispersing particulate matter on the surface of the molten glass bath, the particulate matter being chosen from among powder, frits, flakes or fibers.

28. The process of claim 12, wherein providing the at least one temporary protective surface over-layer is achieved by dispersing material in gel form on the surface of the molten glass bath or on the surface of a previously deposited layer.

29. The process of claim 12, wherein providing the at least one temporary protective Previously Presented over-layer is achieved by depositing a pre-fabricated temporary protective surface over-layer directly on the surface of the molten glass bath or on the surface of a previously deposited layer.

* * * * *